United States Patent [19]

Loibl et al.

[11] Patent Number: 5,505,054
[45] Date of Patent: Apr. 9, 1996

[54] RAPID BEVERAGE COOLING

[76] Inventors: Gregory H. Loibl, 220 E. 14th St. Apt. 3R, New York, N.Y. 10003; Irv Brazinsky, 6 Rustic La., Matawan, N.J. 07747; George Sidebotham, 794 President St., Brooklyn, N.Y. 11215

[21] Appl. No.: 296,702

[22] Filed: Aug. 26, 1994

[51] Int. Cl.⁶ ................................................ F25D 13/06
[52] U.S. Cl. ............................ 62/63; 62/64; 62/375; 62/381
[58] Field of Search ........................ 62/375, 381, 64, 62/63

[56] References Cited

U.S. PATENT DOCUMENTS

| | | |
|---|---|---|
| 2,650,007 | 10/1953 | Lazar . |
| 2,794,326 | 6/1957 | Mencacci . |
| 3,083,547 | 4/1963 | Stevens . |
| 3,283,523 | 11/1966 | Long . |
| 3,316,734 | 5/1967 | Crane, Jr. ................................. 62/381 |
| 4,139,992 | 2/1979 | Fraser ...................................... 62/381 |
| 4,164,851 | 8/1979 | Bryant ..................................... 62/381 |
| 4,304,105 | 12/1981 | West ........................................ 62/375 |
| 4,531,382 | 7/1985 | Butler et al. ............................ 62/375 |
| 4,549,409 | 10/1985 | Smith ...................................... 62/381 |
| 4,580,405 | 4/1986 | Cretemeyer, III ..................... 62/381 |
| 4,628,703 | 12/1986 | Kim . |
| 4,711,099 | 12/1987 | Polan et al. . |
| 4,736,593 | 4/1988 | Williams . |
| 4,803,850 | 2/1989 | Josten et al. . |
| 4,813,243 | 3/1989 | Woods et al. . |
| 4,825,665 | 5/1989 | Micallef . |

*Primary Examiner*—Ronald C. Capossela
*Attorney, Agent, or Firm*—Rosenman & Colin

[57] ABSTRACT

A method and device for the extremely rapid but safe cooling of beverages, including carbonated beverages, in cans or bottles (collectively "containers"). One or more beverage containers are rapidly rotated along their respective longitudinal axes while being downwardly vertically sprayed with a cooling water spray, with the water being in a 0° C. temperature equilibrium with ice. The volumetric rate of the water in the water spray is sufficient to form a continuous coating on the rotating container. Rotation of the containers is effected in a horizontal direction, with the containers being nested between adjacent rotating rollers and rotated with a rotational speed of between 200–500 rpm. Standard 12 oz. beverage cans can be cooled thereby from room temperature to a drinking temperature of 5° C. in under one minute.

29 Claims, 3 Drawing Sheets

RAPID BEVERAGE COOLING

FIELD OF THE INVENTION

This invention relates to methods and devices for use in the rapid cooling of beverages in cans or bottles (beverage "containers").

BACKGROUND OF THE INVENTION

Various devices and methods have been employed in cooling beverages in containers from room temperature to consumption-pleasing low temperatures, generally of about 5° C. The most common method is, of course, the use of commercial or household refrigerators or freezer units into which the beverage containers are statically placed. While effective, such cooling means entails the massive utilization of refrigerator and freezer space (especially in commercial establishments) which is costly and is at a premium when freezer or refrigerator space is generally required for other food storage purposes.

In addition, refrigeration and freezer units (with ambient air cooling) require inordinate initial periods of time, generally of the order of about an hour (freezer) to several hours (refrigerator) being required for cooling of a can of soda from room temperature (20°–25° C.) to the desired 5° C. If reasonably immediate consumption is required, such as at point of sale, at parties, or on very hot days, this time delay for cooling is very undesirable. Accordingly, quick cooling devices have been developed specifically for use with beverage containers. These devices, while generally effective in reducing the time for cooling beverages, nevertheless still require, at a minimum, about five minutes for the cooling of a standard 12 ounce beverage can, having nominal dimensions of about 2.5" diam.× 4.75" height (still an inordinate amount of waiting time for a customer). Furthermore, in commercial embodiments, such cooling devices are usually designed only for cooling of a single container at a time, and are accordingly not suitable for anything other than individual use.

Existing cooling devices have operated on one of two general methods involving heat transfer. A first method, and the most common one, involves cooling with ice such as embodied in a presently commercial device. This device provides for placement of a beverage can on a bed of ice to effect a facilitated heat transfer and cooling. Since only a portion of the container is in contact with the ice, the container is rotated against the ice. In addition, in order to maintain heat transfer-contact with the ice, the device provides for a constant exerted contact pressure of the container with respect to the ice to compensate for melting of the ice and reduction of height. Since ice can have substantially lower temperatures than the desired drinking temperature, heat exchange and beverage temperature lowering is facilitated and hastened.

A second, less effective method involves conveying or placing the beverage containers into a cold water shower or bath. Because of the higher temperatures of the cold water, as compared to ice, cooling times for this method have been substantially longer than that for methods which utilize ice as the cooling medium, even though the cold water shower or bath completely covers the container at all times during cooling.

Despite its effectiveness in cooling (because of its low temperatures relative to water), the use of ice as a cooling medium can however be detrimental in certain common uses. When used for cooling carbonated beverages, particularly when such cooling is not carefully monitored, freezing of the beverage, with untoward consequences, is possible.

The temperature of ice is rarely at 0° C. and is usually significantly lower. As a result, if the ice temperature is sufficiently low and with extensive cooling time, freezing of the beverage within the container is very possible. Since such containers are closed, it is difficult, if not impossible, to monitor temperature and state conditions of the beverage during the cooling process to stop the process prior to any freezing. Under these conditions, with excessive cooling, partially frozen carbonated beverages will detrimentally erupt, on opening of the container. Though cold water is not subject to this detrimental effect with carbonated beverages, its use is however not as efficient in effecting the requisite rapid cooling.

It is accordingly an object of the present invention to provide a means for the very rapid cooling of beverages within containers, with a duration of cooling which is several orders less than that of prior art devices which utilize cooling with ice.

It is a further object of the present invention to provide such rapid cooling but without the detriment of possible freezing of carbonated beverages.

It is a still further object of the present invention to provide such means, with exact temperature control means, in a compact economical device, in embodiments suitable for commercial and residential use.

It is yet another object of the present invention to provide such cooling means with a capability of simultaneously cooling multiple containers.

These and other objects, features and advantages of the present invention will become more evident from the following discussion and drawings in which:

SUMMARY OF THE INVENTION

Figure 1A:
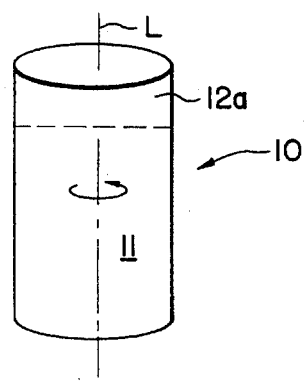
FIGS. 1a and 1b depict a standard 12 ounce beverage can in the upright and horizontal positions, showing the liquid contents level therein in dotted lines.

Generally the present invention comprises a method and device for the rapid cooling of beverages in cans or bottles (containers). In accordance with the method of the present invention, beverage containers are:

1) placed in a horizontal direction;
2) rapidly rotated around their respective longitudinal axes in the horizontal position, preferably at a rate between about 200–500 rpm; and
3) simultaneously, with such rotation, the containers are sprayed with at least one cold water jet by water dispensing means positioned directly above the container (in this regard, end abutted containers are considered to be a single container), for a pre-determined time period, suitable for lowering the temperature of the particular beverage containers, based on their composition (metal, glass, or plastic) and their volume (typically 12, 16 and 25 ounce cans and 12 and 32 ounce bottles) to the desired levels. For optimum beverage cooling, the cold water is preferably at a temperature between 0°–5° C.

A device suitable for use in effecting such temperature reduction of beverages, in accordance with the present invention comprises:

a) container rotating means, capable of horizontally rotating the container at speeds in excess of 200 rpm;

b) means for cooling water to a cooling temperature, preferably between 0°–5° C.; and c) water dispensing means for showering the horizontally rotating container with the cooled water.

In a preferred embodiment the means for cooling water comprises a bath of ice and water at an equilibrium temperature of 0° C., for supplying the water dispensing means with water at 0° C. Alternatively, the water may be cooled by: sealed cooling "freezer" packs, such as those containing gels at sub-zero temperatures; by refrigeration, and the like.

Optionally, and particularly with respect to devices utilized in commercial establishments, the device comprises timing means for showering the containers for a pre-determined time sufficient to effect the requisite cooling. With such timing devices it is also desirable to include container ejection means to automatically remove the container from the cooling device, when cooling is completed.

Though water dispensing with a gravity feed, is capable of providing the requisite cooling water shower, it is desirable that the water be pumped by pumping means and wherein recirculation of the water is possible thereby.

DETAILED DESCRIPTION OF THE INVENTION

In a preferred embodiment of the present invention, rotation is effected with the beverage container(s) being nested between a pair of adjacent rotating rollers which provide the requisite means for rapid rotation. In such embodiment, one or both of the rollers is or are provided with frictional elements to retard rotational slippage and/or the force of the water jet is sufficient to maintain, by continued pressure, seating of the container between the rollers. To avoid timing complications, one roller of the pair is a driver (driven by external means such as with a motor or crank) and the other roller is set to freely rotate. The spaced apart rollers permit deployment of any type of container or size container, whereby a container placed therebetween is driven by the drive roller and is buttressed in rolling relation thereto by the freely rotating roller.

Depending on the size of the container being cooled it is possible to end abut several containers and place them between a single pair of rollers. Alternatively, or in addition thereto, a series of rollers may be utilized for rotation and cooling of multiple containers.

In accordance with a preferred embodiment of the present invention, the water (without ice) is pumped from a reservoir of ice and water, through water pipes, with the water being at a constant equilibrium temperature of 0° C. The water jet, from an open pipe end or nozzle, should be of a volume and velocity, i.e., volumetric flow rate, sufficient to maintain a constant heat-exchange-interface water coating on the rotating containers. A volumetric flow rate of about 90 liters/ minute has been found to be sufficient to provide the requisite continuous heat exchange interface coating for two end abutted standard 12 ounce beverage containers. Generally, a volumetric flow rate of at least 20 liters/minute is sufficient for most applications. An excessively volumetric flow rate (e.g. above about 100 liters/minute), while providing nominally faster cooling times, is not as desirable since it entails the use of a large reservoir and large amounts of ice. Control of the volumetric flow rate can be effected by use of a variable rate pump or by use of different size water restrictors in the water flow path.

Because of the rotational movement of the containers, a water jet of sufficient volumetric flow rate, will tend to spread over the entire surface of the container even if it is limited to a small initial area of impingement on the container. Thus, water jet dispensing means, such as a single shower head is effectively provided directly above a portion of the container or containers, between pairs of rollers. Impingement on the center of the container length provides the most efficient coverage, and is preferred with the minimally effective volumetric flow rates.

In the preferred embodiment, the water of the water jet is at and is maintained at an equilibrium ice-water temperature of 0° C. by recirculation and recycled contact with ice in the supply reservoir. Reduction of the water jet temperature to a lower level by adding salt to the water, is not desirable since it may result in the adverse effects of beverage freezing and expansion with subsequent eruption with opening of the container, if not carefully controlled. In addition, the salt water (brine) tends to leave an objectionable residue with a salty taste on the container even when the container is thoroughly wiped clean.

In a commercial embodiment of the present invention it is desirable that timer control means be provided for controlling the rotation and water jet to predetermined time spans for the particular container or containers being cooled, coupled with container ejection means to facilitate both beverage serving and additional beverage cooling. Since the water temperature is always at 0° C., the water jet impinging rate is known and/or controllable, ambient temperature is known or approximated at being between 20°–30° C., and the container size, type and number are known, the time required for the requisite cooling is predeterminately known as well. Entry of the specific parameters of the container and the desired drinking temperature, permits microprocessor controlled operation of the device of the present invention the correct time required (from memory storage), after which the system shuts itself off. Alternatively, in inexpensive embodiments, the time is manually determined, without any concern about excessive cooling time.

In large scale systems, either containers are conveyed on moving rollers to the spraying site or the sprayers are moved to the containers. In either of these embodiments, rotation is effected only during the actual cooling spraying for maximum efficiency.

DETAILED DESCRIPTION OF THE DRAWINGS AND THE PREFERRED EMBODIMENT

Figure 1B:
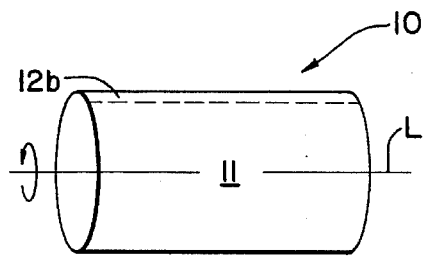

With specific reference to the drawings, FIGS. 1a and 1b depict a typical 12 ounce soda container 10 positioned vertically and horizontally respectively. The soda 11, contained therein is shown with an air space 12a in FIG. 1a and a full can length air space 12b in FIG. 1a. Rotation of the container along its longitudinal axis L, when the container is positioned vertically, results in a rotation of an essentially rigid body with extensive cooling times being required. In contrast, the horizontally disposed container 10 in FIG. 1b, when rotated about its longitudinal axis L, results in the continuous displacement of air and liquid and a high degree of agitation with liquid displacement and substantially increased liquid surface area.

Figure 2:
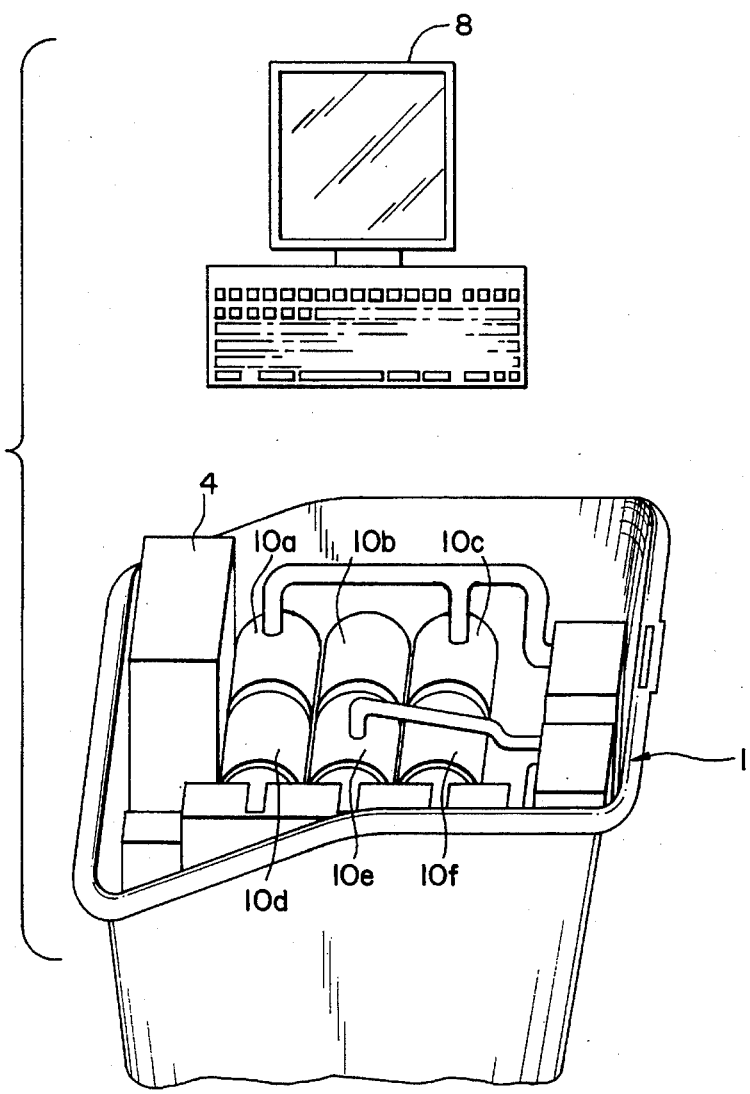
FIG. 2 is perspective view of the cooling device of the present invention with the beverage can of FIGS. 1a and 1b horizontally positioned thereon.
Figure 3:
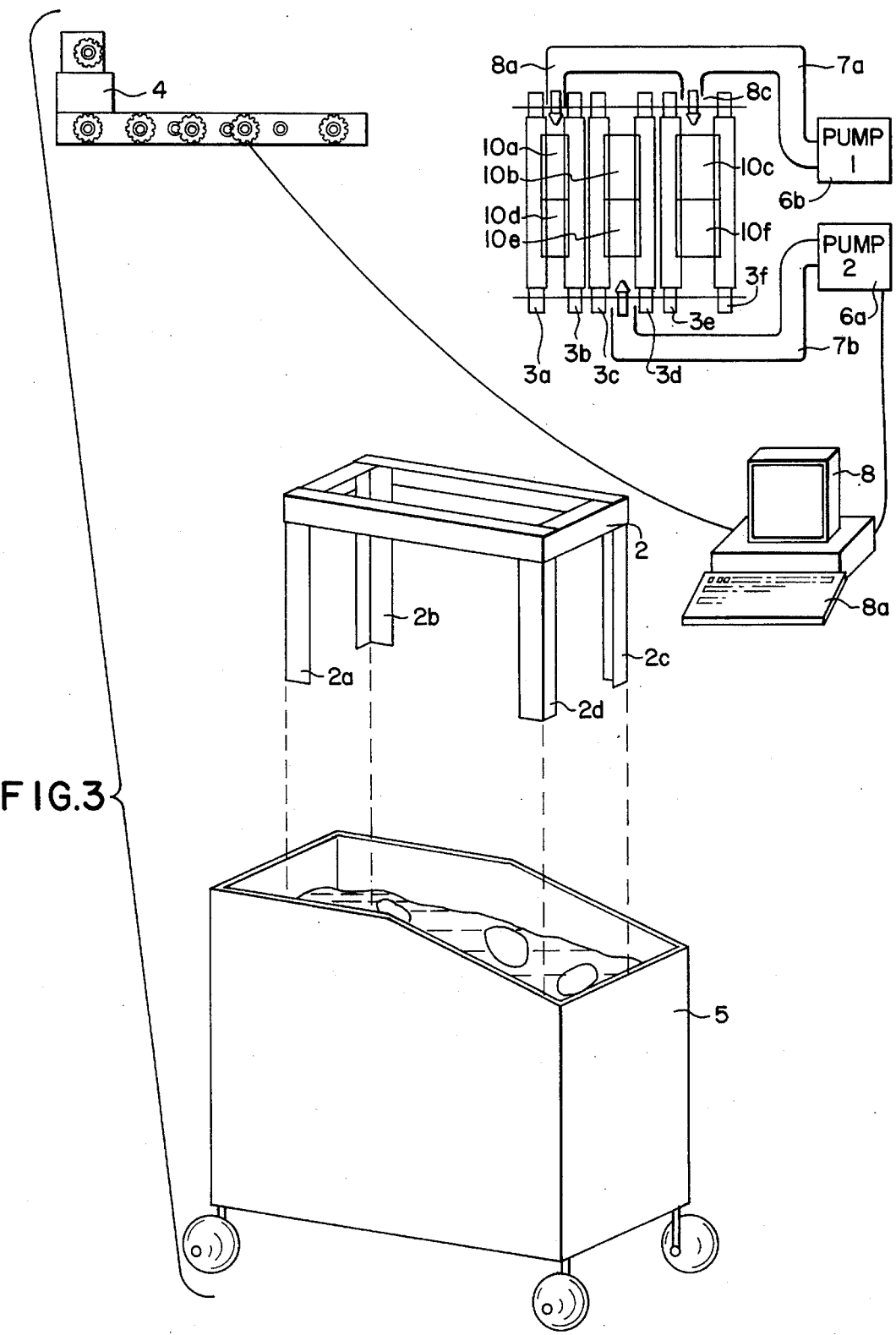
FIG. 3 is an exploded view of the cooling device of the present invention.

In FIG. 2, six twelve ounce cans 10a–f are shown as being horizontally positioned in pairs, in cooling device 1, between successive rollers 3a–f (more clearly seen in FIG. 3).

Cooling device 1, as shown in exploded view in FIG. 3, comprises a support frame 2, upon which are rotatably mounted the aforementioned rollers 3a–f, with motor 4, being geared to drive rollers 3a, 3c, and 3e with chain link drives. The support frame with legs 2a–d is positioned within reservoir 5, containing about 30 gallons of an ice and water mixture whereby the rollers and cans supported thereon are elevated from the ice-water mixture. Submersible water pumps 6a and 6b pump water (a screen, not shown, on each of the pumps prevents ice particles from being carried with the water) through conduit pipes 7a and 7b having shower head fixtures 8a–c which extend over each set of rollers 3a–b, 3c–d, and 3d–f, respectively for direct proximate spraying of cans 10b, 10c, and 10f and peripherally extended spraying of cans 10a, 10d and 10e.

Figure 4:
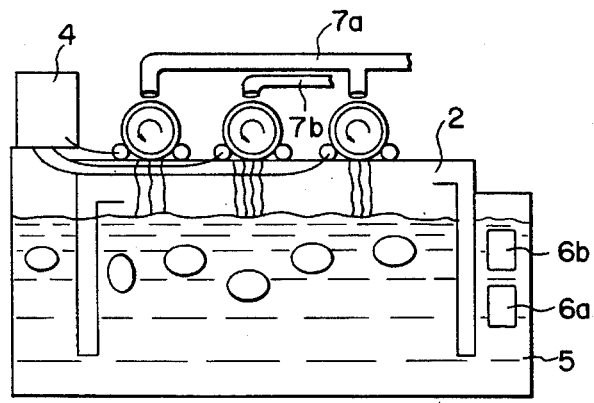
FIG. 4 is a sectioned side view showing the rotational elements of the cooling device and the coating effect of an ice water jet on the rapidly rotating cans.

As schematically depicted in FIG. 4, the impinging water jet hits the cans and is directed by the rotation of the cans to coat the cans with a heat transfer layer of constantly replenished water at 0° C. At the same time, agitated beverage liquid, within the cans presents an extended surface area to the heat transfer effects of the cooling water. The water thereafter drains into the ice water reservoir 5 for recycled equilibrium cooling and recycled jet spraying. The pressurized coating layer serves to keep the normally slippery cans from slipping during the high speed rotation thereof, by continuously forcing the cans against the driving rollers. In contrast to prior art methods and devices, no special suction cups, chambers, or other holding devices are required to keep the container in place for the requisite rotations. As a result, operation of the device of the present invention is nearly universal with any type of generally cylindrical container, regardless of container composition and configuration.

With reference to FIG. 3, the pumps and motor are electrically interconnected with computer control 8 which is preprogrammed with time parameters for cooling of the cans based on the desired temperature, can material and size of the can, with information entered via keyboard 8a. In other embodiments, such parameters can be readily written into EPROM for dedicated microprocessor control. At the appropriate cooling time, the pumps and motor stop and the beverage cans can then be removed from the device.

In order to illustrate the efficacy of the present method and device in cooling beverages, the following examples are presented. It is understood that such examples are only illustrative in nature and are not to be construed as being limitations on the present invention.

EXAMPLE 1

Beverage cans (12 ounce, 16 ounce and 25 ounce aluminum cans, and 12 and 32 glass bottles) were cooled using the apparatus of FIG. 3 from a starting temperature of 30° C. to a final chilled temperature of 5° to 7° C. The cooling jets were kept at a constant rate of 90 liters/minute and the rotational speed of the container was set at 751 rpm. The following Table indicates the final temperature achieved within the range and time required to reach such temperature.

TABLE

| Container type and size | Final Temperature (°C.) | Time (minutes) |
| --- | --- | --- |
| 12 ounce cans | 5.9 | 1.5 |
| 16 ounce cans | 6.2 | 1.5 |
| 25 ounce cans | 6.75 | 1.5 |
| 12 ounce bottles | 5.2 | 3.5 |
| 32 ounce bottles | 6.9 | 7.0 |

It is evident that glass bottles, having a lower thermal conductivity and thicker walls than the aluminum of the cans, require a relatively longer period of time for cooling though still considerably less than that of the prior art devices and methods.

EXAMPLE 2

Six 12 ounce beverage cans were cooled from room temperature to 5° C., using the above described apparatus but with a rotational speed of 345 rpm. The time required for such cooling for all of the cans was between 45 to 50 seconds.

EXAMPLE 3

Beverage cans of 16 ounces and 25 ounces and bottles (750 ml of wine and champagne) were cooled as described in Example 2, with 50 seconds required to chill the 16 ounce can to 5° C. and the 25 ounce can to 5.9° C. Five and six minutes were required to chill the wine and champagne to 7.9° C. and 9.5° C. respectively.

Figure 5:
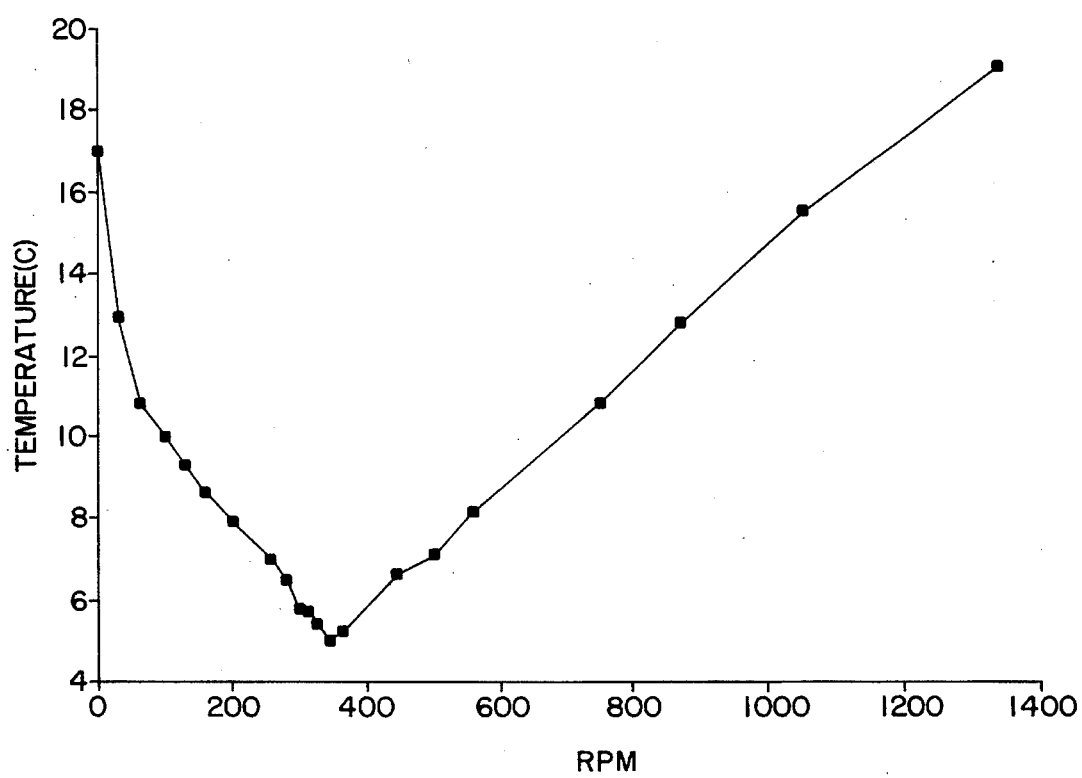
FIG. 5 is a graphical representation of the cooling temperature obtained as a function of rotational speed.

From the above Examples it was surprisingly discovered that contrary to expectations, increasing of rotational speed above about 350 rpm actually increased the amount of time required for the cooling. FIG. 5 is a graphical representation of the temperature obtained as a function of rotational speed.

EXAMPLE 4 (COMPARATIVE)

A twelve ounce beverage can was cooled from ambient temperature (23° C.) to 5° C. by using the commercial prior art device, described above, with rotation of the can (at a speed of about 300 rpm) against a bed of crushed ice. The time required for the cooling was 113 seconds as compared to 47 seconds required by the device of the present invention under identical conditions.

Thus, the method and device of the present invention provides substantially greater cooling performance than devices using ice based cooling and without the detrimental freezing effects inherent with such ice based cooling. It is also noted that the prior art device requires use of a suction cup or other means to hold cans in position, whereas the device of the present invention requires no such restraints.

It is understood that the above examples and described embodiments of the present invention are illustrative of the present invention and details contained therein are not to be construed as limitations on the present invention. Changes in structure, and operative steps are possible without departing from the scope of the present invention as defined in the following claims.

What is claimed is:

1. A method for the rapid cooling of beverages in containers from room temperature to desired drinking temperature levels, comprising the steps of:

a) positioning one or more beverage containers in a horizontal direction;

b) rapidly rotating the beverage containers around their respective longitudinal axes in the horizontal position, and c) simultaneously with such rotation, spraying the one or more beverage containers with one or more jets of cold fluid by fluid dispensing means positioned above the one or more containers, for a pre-determined time period, suitable for lowering the temperature of the beverage containers, based on their composition and their volume, to the desired temperature levels with said rapid rotation being effected in a stationary position relative to the one or more jets.

2. The method of claim 1, wherein said one or more containers are rotated at a rate between about 200 to 500 rpm.

3. The method of claim 2, wherein said one or more containers are metal cans and said rate of rotation is between 300 to 400 rpm.

4. The method of claim 1, wherein said containers are comprised of glass.

5. The method of claim 1, wherein said containers are comprised of plastic.

6. The method of claim 1, wherein said containers are rotated by horizontally positioned rotating rollers with which said containers are in contact.

7. The method of claim 6, wherein said rollers comprise frictional elements to reduce slippage of the containers thereon during said rotation.

8. The method of claim 6, wherein the volumetric rate of said fluid jets is sufficient to maintain the containers in contact with the rotating rollers with reduced slippage.

9. The method of claim 1, wherein said fluid is water.

10. The method of claim 8, wherein said cold water is at a temperature in the range of 0°–5° C.

11. The method of claim 10, wherein said cold water is at an equilibrium temperature of 0° C. from an ice-water reservoir.

12. The method of claim 8, wherein the water jets are of sufficient volumetric flow rate, to spread over substantially the entire surface of the one or more containers.

13. The method of claim 12, wherein the volumetric flow rate is at least 20 liters/minute.

14. The method of claim 8, wherein said water of the water jets is cooled after said spraying and re-used in said water jets.

15. A device for effecting temperature reduction of beverages in containers from room temperature to a desired drinking temperature, in accordance with the method of claim 1, comprising:

a) container rotating means, capable of horizontally rotating the container at speeds in excess of 200 rpm;

b) means for cooling fluid to a cooling temperature, preferably between 0°–5° C.; and c) fluid dispensing means for showering the horizontally rotating container with the cooled fluid, wherein said containers are rotated by the rotation means stationarily relative to the fluid dispensing means.

16. The device of claim 15, wherein said rotating means comprises at least one pair of aligned and proximately positioned rollers adapted to supportingly engage the one or more containers therebetween to effect said rotation.

17. The device of claim 16, wherein said device further comprises means for retarding slippage of engagement between the containers and the rollers.

18. The device of claim 15, wherein means for cooling water to a cooling temperature comprises an ice-water bath.

19. The device of claim 15, wherein said means for cooling fluid to a cooling temperature comprises a refrigeration element.

20. The device of claim 15, wherein said means for cooling fluid to a cooling temperature comprises at least one cooling pack at a sub zero (centigrade) temperature.

21. The device of claim 15, wherein said device further comprises means for recycling the cooling fluid after the showering, for use in additional cooling showering.

22. The device of claim 21, wherein said means for recycling comprises at least one fluid pump.

23. The device of claim 22, wherein said device further comprises control means for varying volumetric flow rate of the showering of the containers.

24. The device of claim 15, wherein said device comprises timing means for controlling showering of the containers for a period of time sufficient to effect said cooling to the cooling temperature.

25. The device of claim 24, wherein said timing means further comprises adjustment means to vary timing according to container size and composition.

26. The device of claim 25, wherein said timing means further comprises ejection means to eject the container from the device after the cooling temperature has been reached.

27. The device of claim 15, wherein said device comprises means for moving the containers to said fluid dispensing means.

28. The device of claim 15, wherein said device further comprises means for moving the fluid dispensing means to the containers.

29. The device of claim 15, wherein said fluid is water.

* * * * *